United States Patent [19]

Pipper et al.

[11] Patent Number: 5,659,009

[45] Date of Patent: Aug. 19, 1997

[54] PRODUCTION OF FILLER-CONTAINING THERMOPLASTIC MOLDING COMPOSITIONS AND MOLDING COMPOSITIONS OBTAINABLE IN THIS WAY

[75] Inventors: Gunter Pipper, Bad Durkheim; Walter Goetz, Ludwigshafen; Claus Cordes, Weisenheim; Josef Georg Floss, Neustadt; Guenter Mattern, Schifferstadt; Peter Hildenbrand, Karlsruhe; James Hurley, Mannheim; Karl Schlichting, Bobenheim-Roxheim; Graham Edmund McKee, Weinheim; Gerd Blinne, Bobenheim, all of Germany

[73] Assignee: BASF Aktiengesellschaft, Ludwigshafen, Germany

[21] Appl. No.: 560,518

[22] Filed: Nov. 17, 1995

Related U.S. Application Data

[63] Continuation of Ser. No. 390,287, Feb. 15, 1995, abandoned, which is a continuation of Ser. No. 5,743, Jan. 19, 1993, abandoned.

[30] Foreign Application Priority Data

Jan. 25, 1992 [DE] Germany .......................... 42 02 004.2

[51] Int. Cl.$^6$ ................................................. C08G 69/26
[52] U.S. Cl. .......................... 528/335; 523/313; 524/599; 524/606; 524/607; 528/336; 528/338; 528/339
[58] Field of Search ..................... 523/313; 524/599, 524/606, 607; 528/335, 336, 338, 339

[56] References Cited

U.S. PATENT DOCUMENTS

| | | | |
|---|---|---|---|
| 4,255,317 | 3/1981 | Coakley | 524/262 |
| 4,537,949 | 8/1985 | Schmidt | 528/335 |
| 4,540,772 | 9/1985 | Pipper | 528/335 |
| 4,973,655 | 11/1990 | Pipper et al. | 528/272 |
| 5,081,222 | 1/1992 | Reimann et al. | 528/324 |
| 5,332,778 | 7/1994 | Pipper et al. | 524/606 |

FOREIGN PATENT DOCUMENTS

| | | |
|---|---|---|
| 56703 | 7/1982 | European Pat. Off. . |
| 129195 | 12/1984 | European Pat. Off. . |
| 129196 | 12/1984 | European Pat. Off. . |
| 267 646 | 5/1988 | European Pat. Off. . |
| 0267646 | 5/1988 | European Pat. Off. . |
| 299444 | 1/1989 | European Pat. Off. . |
| 346735 | 12/1989 | European Pat. Off. . |
| 257558 | 1/1992 | European Pat. Off. . |
| 475 087 | 3/1992 | European Pat. Off. . |
| 282 660 | 9/1990 | Germany . |
| 453666 | 6/1988 | Switzerland . |

*Primary Examiner*—Edward J. Cain
*Attorney, Agent, or Firm*—Keil & Weinkauf

[57] ABSTRACT

In a process for producing filler-containing thermoplastic molding compositions by mixing fillers with thermoplastics in the melt, a) the fillers are mixed in a mixing apparatus in the melt with a low molecular weight thermoplastic having a melt viscosity of at most 30 Pas (measured at 20° C. above the melting point of the thermoplastic compound and at a shear gradient of 1,000 s$^{-1}$), b) the product thus obtained is removed from the mixing apparatus, cooled and comminuted, and c) the comminuted product is then subjected in the solid phase to a post-condensation.

13 Claims, No Drawings

PRODUCTION OF FILLER-CONTAINING THERMOPLASTIC MOLDING COMPOSITIONS AND MOLDING COMPOSITIONS OBTAINABLE IN THIS WAY

This application is a continuation of application Ser. No. 08/390,287, filed on Feb. 15, 1995 now abandoned, which is a continuation of application Ser. No. 08/005,743, filed on Jan. 19, 1993 now abandoned.

The present invention relates to a process for producing filler-containing thermoplastic molding compositions by mixing fillers with thermoplastics in the melt.

The invention also relates to thermoplastic molding compositions that can be obtained by the process.

Thermoplastic molding compositions based on for example polyamides or polyesters with fillers are known per se and are described in the literature.

For example, CH-A 453 666 and U.S. Pat. No. 4,255,317 describe the incorporation of glass fibers in thermoplastics melts, the glass fibers being shortened to lengths of less than 0.3 mm as a result of the shearing action during the incorporation in the extruder. It is not possible to reduce the shearing action, since the glass fiber bundles employed would then not be dispersed into individual fibers. Granules with larger fiber lengths can be produced for example by the method according to EP-A 56 703, according to which glass fiber rovings are impregnated with a thermoplastics melt and the resultant product is then cut. This process produces granules in which the fiber length corresponds to the granule length.

This melt impregnation process is however technically very complicated and has therefore not been widely accepted and employed in practice.

Using the RIM process (reaction injection molding) molding compositions with long glass fibers can also be obtained by dispersing cut fibers in the monomer and then polymerizing the monomer. This process is however restricted to specific monomers that can be polymerized by the RIM process and is also technically complicated. Problems with residual monomers arise specifically in the case of lactam-based polyamides that have been produced by this process, since these residual monomers can be removed only with difficulty from the product and adversely affect the mechanical properties.

Nowadays particulate fillers are generally incorporated in thermoplastics by mixing the thermoplastics granules with the filler in the melt in a suitable mixing apparatus. Overall this process requires a double melting and granulation of the thermoplastics material under shearing action, which on the one hand is expensive and on the other hand has an adverse effect on the mechanical properties.

It is an object of the present invention to provide a process that is technically simple to implement and by which the aforedescribed disadvantages can be avoided.

We have found that this object is achieved according to the invention by the process as claimed in claim 1, wherein a) the fillers are mixed in a mixing apparatus in the melt with a low molecular weight thermoplastic having a melt viscosity of at most 30 Pas (measured at 20° C. above the melting point of the thermoplastic and at a shear gradient of 1,000 s$^{-1}$), b) the product thus obtained is removed from the mixing apparatus, cooled and comminuted, and c) the comminuted product is then subjected in the solid phase to a post-condensation.

This process gives fiber-reinforced molding compositions with long fiber lengths and associated good mechanical properties in a simple manner. Furthermore, the shear stress on the polymer is reduced compared to the prior art processes.

In the first stage of the process according to the invention the fillers are added, in a suitable mixing apparatus, to the melt of a low molecular weight thermoplastic.

The molecular weight of the thermoplastic is chosen so that its melt viscosity, measured at 20° C. above the melting point, is not more than 30 Pas, preferably not more than 18 Pas.

As thermoplastics, in principle all compounds whose molecular weight can be increased by thermal treatment in the solid phase are suitable, though polyamides, polyesters and liquid crystalline polyesters are preferred.

Such polymers are known to the person skilled in the art and are described in numerous places in the literature, and accordingly detailed information need not be given here.

Polyamides, polyesters and liquid crystalline polyesters are polycondensates, ie. polymers that are produced from monomers by condensation with the elimination of low molecular weight compounds.

Such processes are known to the person skilled in the art and are described in numerous places in the literature, and accordingly in this case too detailed information need not be given here.

In general, with such production processes the molecular weight (and thus the melt viscosity) can be controlled in various ways.

One possibility is to terminate the polycondensation after a relatively short reaction time, which can be effected most simply by cooling the reaction mixture.

Another possibility is to add molecular weight regulators; as a rule these are monofunctional compounds that terminate the polycondensation reaction by ensuring that, after their incorporation, no more functional groups that are accessible for further condensation are present at the chain ends. Known examples of molecular weight regulators are monocarboxylic acids or monohydric alcohols or monoamines that are normally used in the preparation of polyamides and polyesters.

Finally, a further possible way of regulating the molecular weight in polycondensations is to control the polycondensation via the molar ratio of the initial monomers. As is known, the maximum molecular weight that can be achieved in a polycondensation depends on the molar ratio of the groups that react with one another in the condensation with the elimination of low molecular weight compounds.

From the above comments it is evident that processes for producing low molecular weight thermoplastics having a melt viscosity (20° C. above their melting point) of at most 30 Pas are known to the person skilled in the art.

The process described in EP-A 129 195 and EP-A 129 196 is particularly advantageous for producing such polyamides, a related process described in EP-A 346 735 is particularly suitable for producing polyesters, while a process such as is described for example in EP-A 257 558 is particularly advantageous for producing liquid crystalline polymers.

The specified melt viscosities for the first stage correspond in the case of polyamides and polyesters to a particularly preferred range of the viscosity number VN from 40 to 100 ml/g, preferably 45 to 80 ml/g, and in particular from 50 to 70 ml/g (in the case of polyamides measured in a 0.5% solution in 96% strength by weight H$_2$SO$_4$ at 25° C., and in the case of polyesters measured in a 0.5% solution in a mixture of o-dichlorobenzene and phenol (weight ratio 1:1) at 25° C.).

Preferred polyamides are poly-ε-caprolactam (polyamide 6), polyhexamethyleneadipamide (polyamide 6,6), their copolymers, and also partly aromatic copolyamides based on terephthalic acid, possibly isophthalic acid, adipic acid, hexamethylenediamine and ε-caprolactam, such as are described for example in EP-A 299 444.

Preferred polyesters are polyalkylene terephthalates, in particular polyethylene terephthalate (PETP) and polybutylene terephthalate (PBTP).

Polyamides with an approximately equimolar ratio of the respective two end groups are preferred. Preferred liquid crystalline polymers are products such as are described for example in DE-A 20 25 971 and EP-A 257 558.

As fillers, in principle all conventional fillers known to the person skilled in the art may be used.

Preferred fillers are for example glass fibers, carbon fibers, potassium titanate whiskers, wollastonite, glass spheres, kaolin, calcium carbonate, talcum or mica. Kaolin, wollastonite or glass fibers are advantageous. Fillers that have been pretreated with a silane that reacts with the respective thermoplastic are preferred (eg. aminosilanes for polyamides, epoxysilanes for polyesters). If glass fibers are used, then those having a diameter of 5 to 20 μm, in particular 8 to 15 μm, are preferred. The glass fibers are generally used in the form of rovings or cut fibers.

Pulverulent reinforcing agents or cut fibers can be mixed with the solid thermoplastic and then mixed for example in an extruder, with melting of the thermoplastic. It is more advantageous to melt the thermoplastic first of all in the extruder and then meter fibers or pulverulent fillers through a feed opening into the melt, whose temperature is in general 10 to 40° C. above the melting point of the thermoplastic. The fibers and also possible further additives are comminuted during the mixing process in the extruder. An arithmetic mean of the fiber length distribution of greater than 250 μm, in particular greater than 300 μm, with at the same time a proportion of less than 1% of fibers larger than 800 μm, is preferably maintained.

In addition to the fillers, in stage a) conventional additives and processing auxiliaries can also be mixed with the thermoplastic, according to the process of the invention. Lubricants, additives enhancing the impact resistance, antioxidants, UV stabilizers, flameproofing agents and pigments may be mentioned here by way of example.

Kneaders, static mixers, single-screw and twin-screw extruders can be used as mixing apparatus, twin-screw extruders being preferred.

A further particularly preferred variant consists in admixing the fillers and possibly the further additives during the discharge of the melt from the polycondensation vessel in which it was produced, without cooling and granulating the melt before the mixing process. Batchwise-operating vessels or continuously operating reactors may be used as polycondensation vessels, and static mixers or twin-screw extruders may be used as mixing apparatus, the melt preferably being degassed simultaneously with the mixing process.

The quantitative ratio of thermoplastic to filler can be chosen in a very wide range according to the process of the invention. For example, the thermoplastic molding compositions may contain 5 to 90, preferably 10 to 75, and particularly preferably 20 to 70% by weight of fillers.

In stage b) of the process according to the invention the products obtained in stage a) are discharged from the employed mixing apparatus and then cooled and comminuted.

In the preferred variant using an extruder as mixing apparatus this means that the products are extruded, cooled and granulated so as to obtain granules as the end product of stage b). In principle however any other type of comminution is possible that affords a product that has a sufficient surface so that it can be subjected in the solid phase to the thermal post-condensation in stage c).

In the last stage of the process according to the invention the comminuted product obtained in stage b) is post-condensed in the solid phase until the molecular weight of the thermoplastic has attained the desired value.

This post-condensation is performed in the solid phase, preferably under an inert gas atmosphere (preferably nitrogen or steam) at above 140° C., but at least at 10°, preferably 20° below the melting point of the thermoplastic.

The viscosity number of the polymer is in general raised by at least 30 units, preferably by at least 50 units, in the course of the aftertreatment in stage c). The viscosity number VN of the end product is generally in the range from 120 to 500 (measured under the same conditions as for the starting polymers), preferably from 130 to 300, and particularly preferably 135 to 250.

The melt viscosity of the thermoplastic (measured at 20° C. above the melting point and at a shear gradient of 1,000 $s^{-1}$), which in stage a) is at most 30 Pas, increases in the post-condensation to values of more than 80, preferably more than 100, and in particular more than 120 Pas.

Thermoplastics that are normally used in injection molding generally have a viscosity number in the range from 140 to 170 ml/g, and even higher viscosity numbers are possible in the case of grades for extrusion and blow molding.

The duration of the post-condensation in the solid phase depends on, among other things, the desired molecular weight of the thermoplastic and the employed temperature and also on the equivalence of the terminal groups, and is generally in the range from 0.5 to 50 hours, preferably 2 to 40 hours, and in particular 3 to 36 hours. The post-condensation time can be reduced by adding a suitable catalyst, for example phosphoric acid, phosphorous acid, hypophosphorous acid and their salts or alkyl or aryl esters.

New products can be obtained according to the process of the invention that were not hitherto known in the art.

On the one hand these new products are thermoplastic molding compositions based on thermoplastics with very high filler contents. Filler contents of at most 50 to 55% by weight can be achieved using the processes known in the state of the art (incorporation in viscous melts); higher filler contents produce foamed, irregular granules on account of the high shear forces that arise, as well as problems caused by frequent interferences in the fabrication process (in particular strand breakages during extrusion). Also, the fillers are insufficiently dispersed, resulting in unsatisfactory mechanical properties. With filler contents of more than 60% by weight it is no longer possible to fabricate molding compositions since the strand breaks practically immediately on extrusion. Filler contents of more than 60% by weight are known only in low viscosity systems such as thermosetting resins. Thermoplastic melts of similar viscosity can be obtained only if the processing temperature is extremely high (which leads to decomposition of the polymers) or the molecular weight of the polymer is chosen to be very low (which leads to unsatisfactory mechanical properties).

According to the process of the invention however thermoplastic molding compositions that contain 10 to 45% by weight of thermoplastics, preferably polyamides, polyesters or liquid crystalline polymers, and accordingly contain 55 to 90% by weight of fillers, can be obtained in a technically simple way. The solution viscosity of the thermoplastics in these molding compositions is preferably in the range from 120 to 200, especially 130 to 180 ml/g. Such products are not known from the state of the art.

A second group of these filler-co comprises filler-containing thermoplastics with a high molecular weight and high viscosity numbers of the thermoplastic in the end product, and containing fibrous or coarsely particulate fillers.

In the fabrication of thermoplastics with viscosity numbers of more than 150, in particular more than 180 ml/g and especially more than 230 ml/g in an extruder together with fillers, there is a decrease in molecular weight that is all the more pronounced the higher the filler proportion and the larger the initial molecular weight of the thermoplastic. The maximum molecular weight that can be attained in the fabrication of thermoplastics with reinforcing fillers is thereby restricted.

If thermoplastics with a higher molecular weight are fabricated, degradation will always occur until this maximum molecular weight is reached.

According to the process of the invention however thermoplastic molding compositions based on polyamides and/or polyesters can be obtained in a simple way, which contain 5 to 90, preferably 10 to 70% by weight of fillers and in which the polyamides have a viscosity number of more than 160 ml/g (measured in a 0.5% solution in 96% $H_2SO_4$ at 25° C.) and the polyesters likewise have viscosity numbers of more than 160 ml/g (measured in a 1:1 (weight ratio) mixture of o-dichlorobenzene and phenol at 25° C.). The polyamides and polyesters in the products according to the invention preferably have viscosity numbers of more than 170 ml/g, particularly preferably more than 200 ml/g.

The products obtainable according to the process of the invention have good mechanical properties and can therefore advantageously be used to produce molded articles and sheets.

In particular, thermoplastic molding compositions with fibrous fillers have good mechanical properties compared to products known from the state of the art, by virtue of their good fiber length distribution and longer fiber length.

EXAMPLES

The viscosity numbers (VN) of the polyamides used in the Examples were determined in each case in a 0.5% solution in 96% $H_2SO_4$ at 25° C.

The tensile strength was determined according to DIN 53 455, the impact resistance $a_n$ according to DIN 53 453, the damaging energy $W_s$ according to DIN 53 443 on disks (d=60 mm, 2 mm thick), the modulus of elasticity according to DIN 53 457, the notched bar impact strength according to DIN 53 453-K, and the Izod values according to ISO 180/4A.

Examples 1 to 10

The following components were used:

PA/1: Polyhexamethyleneadipamide, VN=54; melt viscosity at 275° C. and 1,000 $s^{-1}$=10 Pas (measured with a high pressure capillary viscometer)

PA*/1 a, b, c: Polyhexamethyleneadipamides with the following melt viscosities at 275° C., measured as in the case of PA/1
  1a: 130 Pas
  1b: 115 Pas
  1c: 105 Pas PA/2: Copolyamide of 45% by weight of terephthalic acid/hexamethylenediamine and 55% by weight of adipic acid/hexamethylenediamine, VN=48, produced according to EP-A 299 444; melt viscosity at 317° C. and 1,000 $s^{-1}$:11 Pas PA*/2: Copolyamide with a composition corresponding to PA/2, but with a melt viscosity of 153 Pas at 317° C. (measured as in the case of PA/2), corresponding to a viscosity number of 154 ml/g.

F/1: Cut glass fibers with a fiber length of 4.5 mm and a fiber diameter of 10 μm; aminosilane sizing (Gevetex® 5135)

F/2: Cut carbon fibers with a fiber length of 6 mm and a fiber diameter of 6.7 μm (Celion ® 6N from Celion Carbon Fibers).

In Examples 1, 4, 7 and 9 according to the invention the polyamides PA/1 and PA/2 were melted in a twin-screw extruder (ZSK 40, Werner & Pfleiderer) at 200 rpm and at a throughput of 25 kg/h, the fibers F/1 amd F/2 were added, and the mixture was extruded, cooled and granulated. The resultant products were then post-condensed in the solid phase under nitrogen at 160° C. (PA/1) or 200° C. (PA/2) until the VN values given in the Table were reached. In Comparative Examples 2, 5, 8 and 10 F/1 and F/2 were incorporated directly into corresponding polyamide (PA*) having the specified viscosity number.

In Comparative Examples 3 and 6 the last stage (post-condensation) of the process according to the invention was not carried out.

The composition of the mixtures and the results of the measurements are shown in Table 1 and Table 2.

TABLE 1

| Ex. No. | Polyamide [% by weight] | Filler [% by weight] | VN of the polyamide | | |
|---|---|---|---|---|---|
| | | | Starting material | after fabrication | after heating |
| 1 | 70 PA/1 | 30 F/1 | 55 | 59 | 154 |
| 2V | 70 PA*/1a | 30 F/1 | 150 | 146 | — |
| 3V | 70 PA/1 | 30 F/1 | 55 | 59 | — |
| 4 | 80 PA/1 | 20 F/2 | 55 | 58 | 137 |
| 5V | 80 PA*/1b | 20 F/2 | 140 | 140 | — |
| 6V | 80 PA/1 | 20 F/2 | 55 | 58 | — |
| 7 | 65 PA/2 | 35 F/1 | 55 | 59 | 148 |
| 8V | 65 PA*/2 | 35 F/1 | 154 | 145 | — |
| 9 | 60 PA/1 | 40 F/2 | 55 | 62 | 133 |
| 10V | 60 PA*/1c | 40 F/2 | 133 | 130 | — |

V = Comparative Example

TABLE 2

| | Properties of the products | | | |
|---|---|---|---|---|
| Example | Fiber length [μm] | Tensile strength dry [MPa] | Modulus of elasticity [MPa] | Impact strength 23° C., kJ/m² |
| 1 | 348 | 210 | 10900 | 53 |
| 2V | 252 | 194 | 10000 | 40 |
| 3V | 348 | 98 | 10750 | 8 |
| 4 | 319 | 225 | — | 38 |
| 5V | 191 | 201 | — | 30 |
| 6V | 319 | 103 | — | 7 |
| 7 | 325 | 226 | 13130 | 60 |
| 8V | 218 | 197 | 12090 | 51 |
| 9 | 282 | 272 | 26900 | 32 |
| 10V | 157 | 245 | 24500 | 28 |

V = Comparative Example

Examples 11 to 18

The following components were used:

Polyamide: polyhexamethyleneadipamide with the respective viscosity number and melt viscosity given in Table 3 (measurement as described in Examples 1 to 10)

Filler: F/1 from Examples 1 to 10

70% by weight of the respective polyamide was melted in a ZSK 40 twin-screw extruder (as in Examples 1 to 10) and the filler (30% by weight) was incorporated in the melt at 280° C. After extrusion, cooling and granulation the product was post-condensed in the Examples according to the invention in the solid phase to the specified VN values. The results are given in Table 3.

The results show that VN values of the polyamide can be achieved by the process of the invention which are unattainable according to the prior art.

which the flexural strength was measured according to DIN 53 452 and the tensile strength according to DIN 53 455-3. The cut weight was determined by weighing 1,000 ml of granules (after mechanical shaking). The torque was measured in % of the maximum torque of the extruder.

The following components were used:

PA/3: Polyhexamethyleneadipamide, VN=54; melt viscosity 10 Pas (measured as for PA/1)

PA*/3: Polyhexamethyleneadipamide, VN=144; melt viscosity 144 Pas (Ultramid® A3 from BASF)

TABLE 3

| Ex. No. | VN polyamide Starting material | after fabrication | after heating | Fiber length [μm] | Modulus of elasticity [MPA] | Impact strength 23° C., kJ/m$^2$ |
|---|---|---|---|---|---|---|
| 11 | 55/10[1] | 59 | 136 | 348 | 11100 | 42 |
| 12 | 55/10[1] | 59 | 154 | 348 | 10900 | 53 |
| 13 | 55/10[1] | 59 | 185 | 348 | 11400 | 62 |
| 14 | 55/10[1] | 59 | 214 | 348 | 10800 | 64 |
| 15V | 135/105[1] | 138 | — | 239 | 10400 | 42 |
| 16V | 150/130[1] | 146 | — | 252 | 10000 | 40 |
| 17V | 187/250[1] | 152 | — | 211 | 10000 | 46 |
| 18V | 205/400[1] | 144 | — | 176 | 9600 | 44 |

V = Comparative Example
[1]Melt viscosity in Pas at 275° C. and 1,000 s$^{-1}$

Examples 19 to 45

In these Examples polyamides with high filler contents are produced by the process according to the invention.

The amounts of polyamide specified in Table 4 were melted in a twin-screw extruder (ZSK 53, Werner & Pfleiderer) and the fillers were incorporated at 280° C. (PA/3) and 320° C. (PA/4). The throughput was 30 kg/h, and the extruder speed was 160 rpm.

After the mixing process, the products were discharged, cut into strands, cooled with water, granulated, and dried in vacuo for 8 hours at 80° C.

In the Examples according to the invention the product was then heated for 16 hours at 170° C. (PA/3) or for 12 hours at 190° C. (PA/4) with superheated steam.

Test articles were produced from the products by injection molding at 280° C. (PA/3) and 320° C. (PA/4), following PA/4: Copolyamide of 70% by weight terephthalic acid/hexamethylenediamine and 30% by weight ε-caprolactam, produced according to EP-A 299 444; melt viscosity (317° C., 1,000 s$^{-1}$) 20 Pas, VN=54

PA*/4: chemical composition as PA/4, VN=130 ml/g, and melt viscosity 200 Pas

F/1: as described in Examples 1 to 10

F/3: calcined kaolin, mean diameter 1.2 μm, with an aminosilane sizing (Polarite® 102A from English China Clay)

The torque is given in %, based on the maximum torque of the extruder.

The compositions and the results of the measurements are given in Table 4.

TABLE 4

| Ex. No. | Polyamide [% by weight] | Filler [% by weight] | VN after heating ml/g | Tensile strength MPa | Flexural strength MPa | Apparent density g/l | Torque, % of maximum value |
|---|---|---|---|---|---|---|---|
| 19 | 55 PA/3 | 45 F/1 | 145 | 2332 | — | 720 | 38 |
| 20 | 50 PA/3 | 50 F/1 | 141 | 245 | — | 740 | 40 |
| 21 | 45 PA/3 | 55 F/1 | 152 | 270 | — | 680 | 43 |
| 22 | 40 PA/3 | 60 F/1 | 150 | 260 | — | 660 | 42 |
| 23 | 35 PA/3 | 65 F/1 | 140 | 245 | — | 530 | 43 |
| 24 | 30 PA/3 | 70 F/1 | 155 | 232 | — | 410 | 46 |
| 25V | 55 PA*/3 | 45 F/1 | — | 225 | — | 670 | 50 |
| 26V | 50 PA*/3 | 50 F/1 | — | 230 | — | 670 | 58 |
| 27V | 45 PA*/3 | 55 F/1 | — | 230 | — | 570 | 62 |
| 28V | 40 PA*/3 | 60 F/1 | — | 216 | — | 400 | 70 |
| 29V | 35 PA*/3 | 65 F/1 | — | x[1] | — | x[1] | 80[2] |
| 30V | 30 PA*/3 | 70 F/1 | — | x[1] | — | x[1] | 80[2] |
| 31 | 50 PA/3 | 50 F/3 | 144 | — | 165 | 870 | 40 |
| 32 | 45 PA/3 | 55 F/3 | 138 | — | 172 | 910 | 38 |
| 33 | 40 PA/3 | 60 F/3 | 154 | — | 184 | 960 | 40 |
| 34 | 35 PA/3 | 65 F/3 | 153 | — | 189 | 1020 | 49 |
| 35 | 30 PA/3 | 70 F/3 | 142 | — | 193 | 1100 | 50 |
| 36V | 50 PA*/3 | 50 F/3 | — | — | 158 | 730 | 52 |

TABLE 4-continued

| Ex. No. | Polyamide [% by weight] | Filler [% by weight] | VN after heating ml/g | Tensile strength MPa | Flexural strength MPa | Apparent density g/l | Torque, % of maximum value |
|---|---|---|---|---|---|---|---|
| 37V | 45 PA*/3 | 55 F/3 | — | — | 160 | 520 | 65 |
| 38V | 40 PA*/3 | 60 F/3 | — | — | $x^{1)}$ | $x^{1)}$ | $80^{2)}$ |
| 39V | 35 PA*/3 | 65 F/3 | — | — | $x^{1)}$ | $x^{1)}$ | $80^{2)}$ |
| 40 | 55 PA/4 | 45 F/1 | 138 | 260 | — | 710 | 43 |
| 41 | 50 PA/4 | 50 F/1 | 146 | 273 | — | 685 | 43 |
| 42 | 45 PA/4 | 55 F/1 | 151 | 281 | — | 640 | 45 |
| 43V | 55 PA*/4 | 45 F/1 | — | 258 | — | 480 | 54 |
| 44V | 50 PA*/4 | 50 F/1 | — | 262 | — | 410 | 77 |
| 45V | 45 PA*/4 | 55 F/1 | — | $x^{1)}$ | — | $x^{1)}$ | $x^{1)}$ |

V = Comparison Example
$^{1)}$material cannot be fabricated due to strand breakage
$^{2)}$not accurately measurable due to marked fluctuations

We claim:

1. A process for producing a filler-containing thermoplastic molding composition by mixing fillers with polyamides in the melt, which comprises:

a) mixing the fillers in a mixing apparatus in the melt with a low molecular weight polyamide having a melt viscosity of at most 30 Pas (measured at 20° C. above the melting point of the thermoplastic and at a shear gradient of 1,000 s$^{-1}$, wherein the weight ratio of filler to polyamide is from 10% to 90%), b) removing the product thus obtained from the mixing apparatus, and cooling and comminuting the product, and c) subjecting the comminuted product thereafter in the solid phase to a post-condensation.

2. A process as defined in claim 1, wherein an extruder is used as the mixing apparatus in stage a).

3. A molded article produced from a thermoplastic molding composition obtained by the process defined in claim 1.

4. A process as defined in claim 1, wherein the melt viscosity of the polyamide is at most 18 Pas.

5. A process as defined in claim 1, wherein the comminuted product is heated in step c) above 140° C. but at least 10° C. below the melting point of the comminuted product.

6. A process as defined in claim 1, wherein the comminuted product is heated in step c) above 140° C. but at least 20° C. below the melting point of the comminuted product.

7. A process as defined in claim 1, wherein the viscosity numbers of the comminuted product are raised by at least 30 units in step c).

8. A process as defined in claim 1, wherein from 50 to 90 weight percent of the comminuted product consists of filler.

9. A process for producing a filler-containing thermoplastic molding composition as defined in claim 1, wherein the polyamide is polyamide 6, polyamide 6,6, copolymers of polyamide 6 and polyamide 6,6 or partly aromatic copolyamides based on terephthalic acid, isophthalic acid, adipic acid, hexamethylenediamine and ε-caprolactam.

10. A process as defined in claim 1, wherein the polyamide is polyamide 6.

11. A process as defined in claim 1, wherein the polyamide is polyamide 6,6.

12. The process of claim 1 wherein the weight ratio of filler to polyamide is from 10% to 75%.

13. The process of claim 1 wherein the weight ratio of filler to polyamide is from 20% to 70%.

* * * * *